US009491355B2

(12) United States Patent
Lowell

(10) Patent No.: US 9,491,355 B2
(45) Date of Patent: Nov. 8, 2016

(54) SYSTEM FOR CAPTURING AN IMAGE OF A DAMAGED VEHICLE

(71) Applicant: Neal Lowell, San Diego, CA (US)

(72) Inventor: Neal Lowell, San Diego, CA (US)

(73) Assignee: Audatex North America, Inc., San Diego, CA (US)

( * ) Notice: Subject to any disclaimer, the term of this patent is extended or adjusted under 35 U.S.C. 154(b) by 78 days.

(21) Appl. No.: 14/461,897

(22) Filed: Aug. 18, 2014

(65) Prior Publication Data
US 2016/0050364 A1    Feb. 18, 2016

(51) Int. Cl.
*H04N 5/232* (2006.01)
*G06Q 40/08* (2012.01)

(52) U.S. Cl.
CPC .......... *H04N 5/23222* (2013.01); *G06Q 40/08* (2013.01); *H04N 5/23216* (2013.01); *H04N 5/23293* (2013.01); *H04N 5/23296* (2013.01)

(58) Field of Classification Search
CPC .................................................. H04N 5/23293
USPC ....................................... 348/333.01–333.06
See application file for complete search history.

(56) References Cited

U.S. PATENT DOCUMENTS

| 7,973,848 | B2* | 7/2011 | Koh | G06K 9/00221 348/333.02 |
| 8,712,893 | B1* | 4/2014 | Brandmaier | G06Q 40/08 705/35 |
| 8,736,666 | B2* | 5/2014 | Ishida | H04N 5/23238 348/218.1 |
| 2007/0213616 | A1* | 9/2007 | Anderson | A61N 7/02 600/448 |
| 2009/0138290 | A1* | 5/2009 | Holden | G06Q 10/087 705/4 |
| 2011/0218825 | A1* | 9/2011 | Hertenstein | G06Q 40/08 705/4 |
| 2011/0228123 | A1* | 9/2011 | Matsumoto | H04N 5/23238 348/222.1 |
| 2015/0103170 | A1* | 4/2015 | Nelson | G06Q 40/08 348/148 |

* cited by examiner

*Primary Examiner* — Anthony J Daniels
(74) *Attorney, Agent, or Firm* — Ben J. Yorks; Irell & Manella LLP

(57) ABSTRACT

A device and method that assists a user in photographing a vehicle for documenting a condition of the vehicle for a vehicle insurance estimate. The device is a camera that captures images of the vehicle. The camera includes a screen that displays an image of the vehicle and a graphical arrow that indicates a direction in which a plurality of vehicle images are to be captured. The camera also includes a memory that stores a plurality of captured vehicle images of the vehicle each captured from a different vantage point. The camera transmits the plurality of captured vehicle images that are reviewed at an insurance estimate computer.

17 Claims, 11 Drawing Sheets

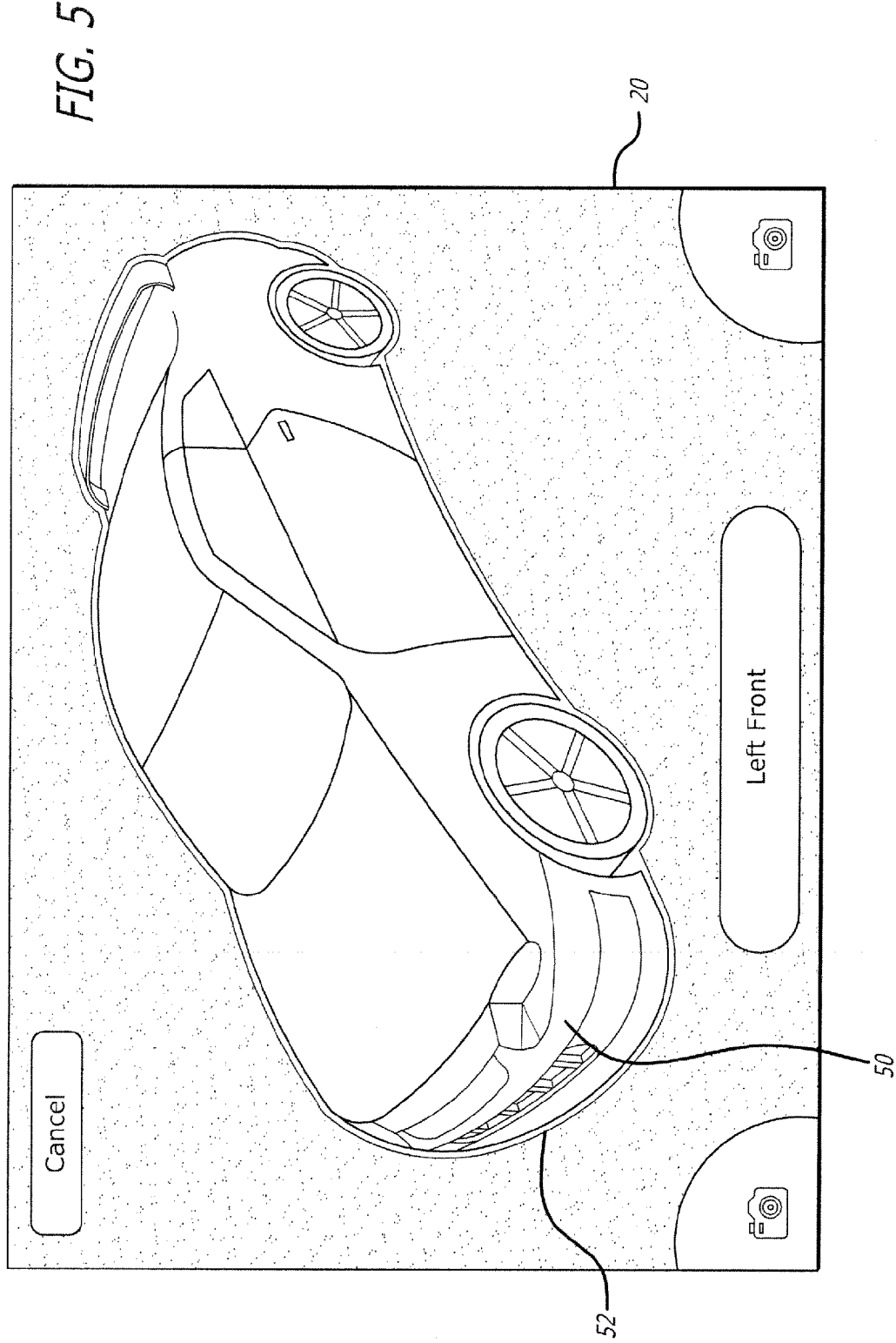

| Claim # : 2345634523541234 | Desc: | Status: Assigned | Gross Total: |
|---|---|---|---|

VIN Selection

| Assignment VIN | Inspection VIN 102 | Reason For No VIN |
|---|---|---|
| [ Copy ] | WDBWK54F86F121718 | [▽] |
| | AudaVIN Information Received. | |

Vehicle Information

⦿ Vehicle Selection ―104  ◯ Vehicle Not Listed

| Origin: European ▽ | Make: Mercedes-Benz ▽ —106 | Year: 2006 ▽ —108 |
|---|---|---|
| Model: SLK280 ▽ —110 | Style: STD 2D Convertible 2WD Gasoline ▽ 112 | |
| Engine: 6cyl Gasoline 3.0 ▽ | Transmission: 7-Speed Automatic ▽ | |
| Mileage: —114 | Typical Mileage: —116 | Mileage Type: Actual ▽ |

Other Vehicle Information

| Lic. Plate: | Lic. State: ▽ | Lic. Expire: |
|---|---|---|
| Condition: ▽ | Veh Insp#: | Proc Date: |

| | Paint Code | Color |
|---|---|---|
| Exterior: | | |
| Interior Trim: | | |

---

| Claim # : 2345634523541234 | Desc: | Status: Assigned | Gross Total: |
|---|---|---|---|
| 2006 Mercedes-Benz SLK280 | Packages and Options  Aftermarket Items | | |

Packages — Package Description

- ☐ Comfort Package(T)
- ☐ Heating Package(T)
- ☑ *Premium Package*
- ☐ Wood Trim Package

*Comfort Package(T)*
-Includes Automatic Dimming Mirror, Driver Seat Memory, Dual Power Seats, Pwr Tilt/Tele. Str Wheel

*Heating Package(T):*
-Included Heated Front Seats, AIRSCARF Ventilated Headrest

*Premium Package:*

Options

Optional Equipment
- ☐ Automatic Dimming Mirror(T)
- ☐ Driver Seat Memory(T)
- ☐ Headlight Washers
- ☑ *AM/FM In-dash CD Changer*
- ☐ Navigation System
- ☑ *Rain-Sensing W/S Wipers*
- ☐ Wood Interior Trim

- ☐ Cargo/Trunk Liner
- ☐ Dual Power Seats(T)
- ☐ Heated Front Seats(T)
- ☐ Leather/Wood Steer Wheel
- ☐ Pwr Tilt/Tele. Str Wheel(T)
- ☐ Sirius Satellite Radio
- ☐ Xenon Headstamps

- ☐ Cellular Telephone
- ☑ *Garage Door Opener*
- ☐ Harman Kardon Sound Sys
- ☑ *Metallic Paint*
- ☐ Run-Flat/Self-Seal Tires
- ☐ Tire Pressure Monitor Optional Equipment
- ☑ *Anti-lock Brakes*
- ☑ *Air Conditioning*
- ☑ *Alarm System*

☐ None  (S)Standard, (T) - Typical

Align wireframe on top of vehicle

SYSTEM FOR CAPTURING AN IMAGE OF A DAMAGED VEHICLE

BACKGROUND OF THE INVENTION

1. Field of the Invention

The subject matter disclosed generally relates to a method and system for photographing a vehicle for an insurance claim.

2. Background Information

When a vehicle such as an automobile is damaged the owner may file a claim with an insurance carrier. A representative typically inspects the vehicle to determine the amount of damage and the costs required to repair the automobile. The owner of the vehicle or the vehicle repair facility may receive a check equal to the estimated cost of the repairs. If the repair costs exceed the value of the automobile, or a percentage of the car's value, the representative may "total" the vehicle. The owner may then receive a check based on the value of the automobile.

The repair costs and other information may be entered by the representative into an estimate report. After inspection the representative sends the estimate report to a home office for approval. To improve the efficiency of the claims process there have been developed computer systems and accompanying software that automate the estimate process. By way of example, the assignee of the present invention, Audatex, Inc., ("Audatex") provides a software product under the trademark Audatex Estimating that allows a representative to enter claim data. The data is processed into an estimate for repairing the vehicle and/or a valuation report of the vehicle.

Photographs of the damaged vehicle are sometimes used in the estimating process. By way of example, the photograph may be attached to the estimate. To promote consistency in generating insurance estimates it is desirable to capture vehicle photographs in a systematic manner. A photograph only provides a two dimensional visual representation of the vehicle. A two dimensional image may not capture shading, etc. that accurately reflect the damage to the vehicle. It would be desirable to provide a system that would provide a three dimensional visual of the vehicle.

BRIEF SUMMARY OF THE INVENTION

A device and method that assists a user in photographing a vehicle for use in a vehicle insurance estimate. The device is a camera that captures images of the vehicle. The camera includes a screen that displays an image of the vehicle and a graphical arrow that indicates a direction in which a plurality of vehicle images are to be captured. The camera also includes a memory that stores a plurality of captured vehicle images of the vehicle each captured from a different vantage point. The camera transmits the plurality of captured vehicle images that are reviewed at an insurance estimate computer.

BRIEF DESCRIPTION OF THE DRAWINGS

FIG. 5 is an illustration showing the vehicle image aligned with the graphic overlay;

FIG. 6 is an illustration of a estimating page with different vehicle information fields;

FIG. 7 is an illustration of a graphical user interface used to enter and/or select damaged parts of a vehicle;

FIG. 8 is an illustration of graphical user interface that provides a running cost total for the repair estimate of the damaged vehicle;

DETAILED DESCRIPTION

Disclosed is a device and method that assists a user in photographing a vehicle for use in a vehicle insurance estimate. The device is a camera that captures images of the vehicle. The camera includes a screen that displays an image of the vehicle and a graphical arrow that indicates a direction in which a plurality of vehicle images are to be captured. The camera also includes a memory that stores a plurality of captured vehicle images of the vehicle each captured from a different vantage point. The camera transmits the plurality of captured vehicle images that are reviewed at an insurance estimate server. An adjuster can play back the captured vehicle images at a rate that provides a 3-D visual representation of the vehicle.

Figure 1:
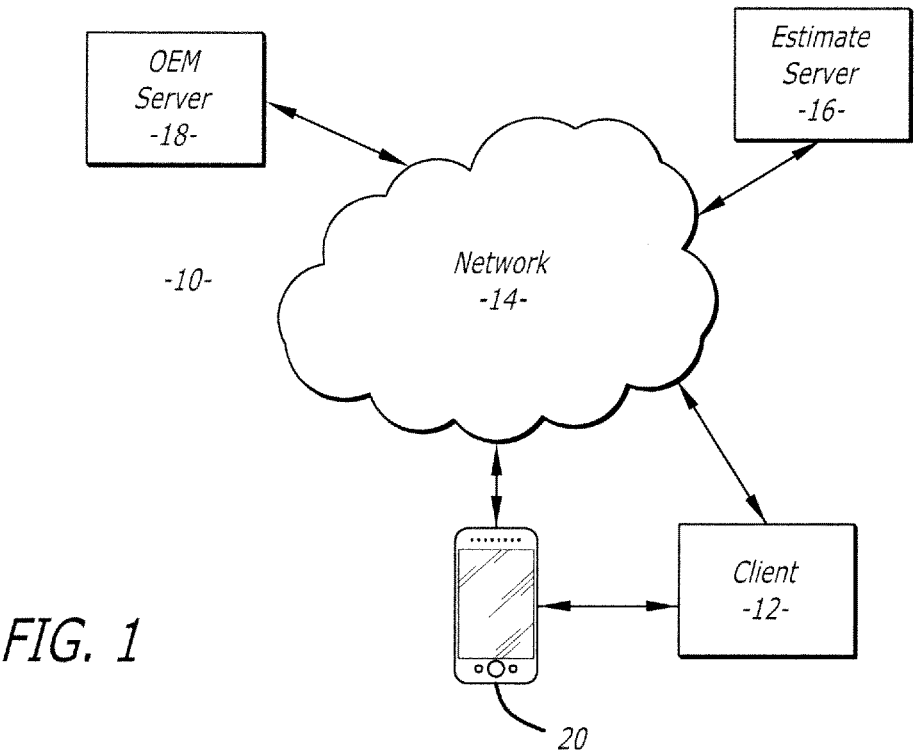
FIG. 1 is a schematic of a system that can be used to photograph a vehicle.

Referring to the drawings more particularly by reference numbers, FIG. 1 shows a system 10 that can be used to photograph a vehicle to document a condition of the vehicle. The system 10 may include at least one client 12 that is connected to an electronic communication network 14. The electronic communication network 14 may be a wide area network (WAN) such as the Internet. Accordingly, communication may be transmitted through the network 14 in TCP/IP format. The client 12 could be any type of device that can access the network 14.

The system 10 may further include an claim server 16 connected to the network 14. The claim server 16 may provide a web based portal that provides access to a repair cost estimate and/or a vehicle valuation web site. The web site may provide one or more web pages that can be used by a representative to generate a repair cost estimate and/or a vehicle valuation. By way of example, the representative may utilize the web pages to determine the estimate and/or a vehicle valuation of a vehicle. Although one claim server 16 is shown, it is to be understood that the claim server may include two or more separate servers including a web server and an application server that together perform various functions.

The system may also include an OEM server 18 that can be coupled to the claim server 16 and clients 12 through the network 14. The OEM server 18 may contain a database that includes vehicle model information and vehicle option information. The OEM server 18 may provide vehicle model information and vehicle options information based on a VIN. Although a web based system is shown and described, it is to be understood that a non-web based system could be employed.

The system 10 may also include a camera device 20 that can be used to capture an image of a vehicle. The device 20 may be a smartphone, tablet or a similar device that contains a camera, a screen and processing to create a graphic overlay. The camera device 20 may be coupled to the client 12.

Figure 2:
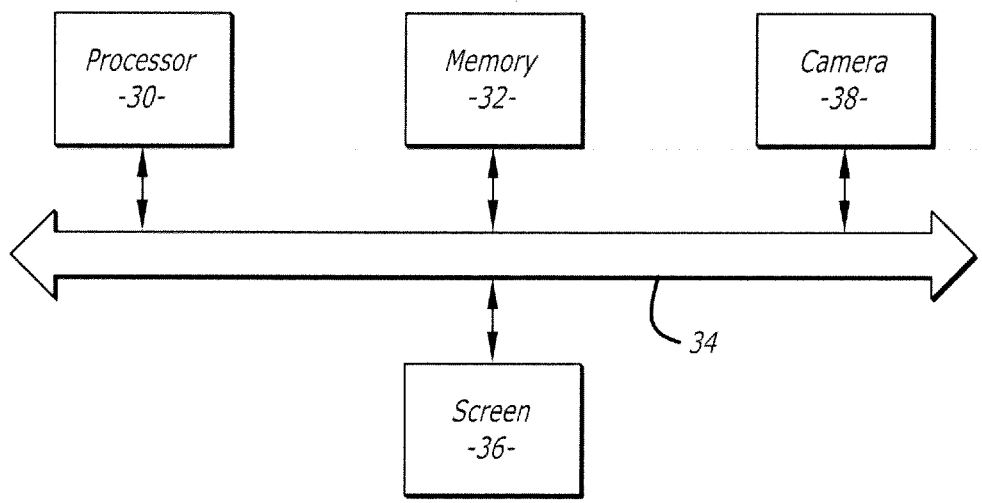
FIG. 2 is a schematic of a camera device of the system.

FIG. 2 shows an embodiment of a camera device 20. The camera device 20 includes a processor 30 connected to one or more memory devices 32 through a bus 34. The memory device 32 may include both volatile and non-volatile memory such as read only memory (ROM) or random access memory (RAM). The processor 30 is capable of operating software programs in accordance with instructions and data stored within the memory device 32. Without limiting the scope of the invention the term computer readable medium may include the memory device 32. The computer readable medium may contain software programs in binary form that can be read and manipulated by the processor 30.

The camera device 20 further includes a screen 36 and a camera 38. The device 20 may also include transceivers and network ports to communicate with external sources such as the servers 16 and 18 shown in FIG. 1.

The servers 16 and 18 may contain relational databases that correlate data with individual data fields and a relational database management system (RDBMS). The RDBMS of the server 16 may include a reference to a website that can be accessed by the client 12 and/or camera device 20. The website has one or more specific uniform resource locators (URL) that can be used to access the site through the network 14. The URL can be entered through a web-based application resident in the client computer 12 and/or device 20. By way of example, the web based application may be a browser. Servers 16 and/or 18 may contain a database of graphic overlays that are associated with vehicle information.

Figure 3:
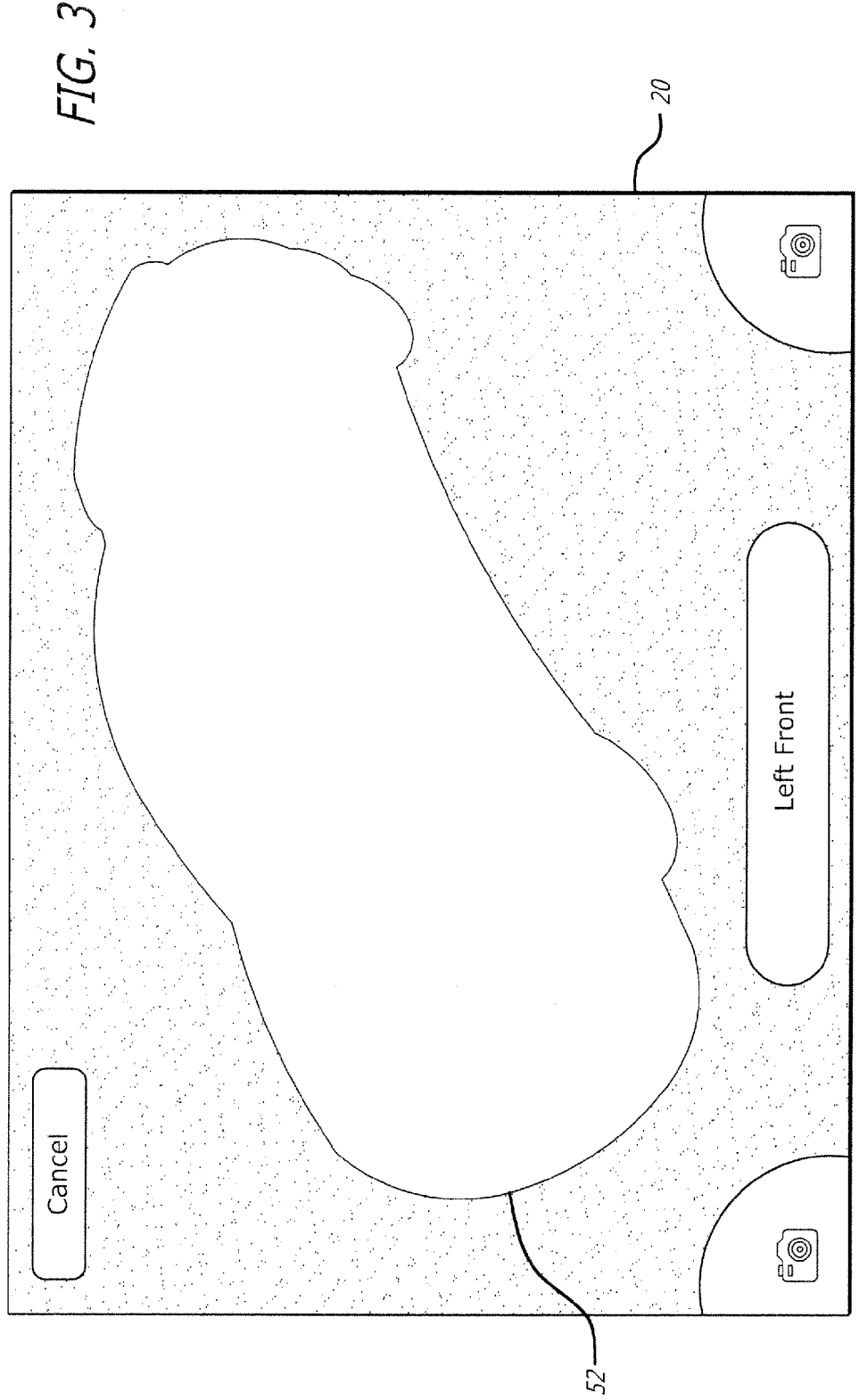
FIG. 3 is an illustration showing a graphical overlay of a vehicle.
Figure 4:
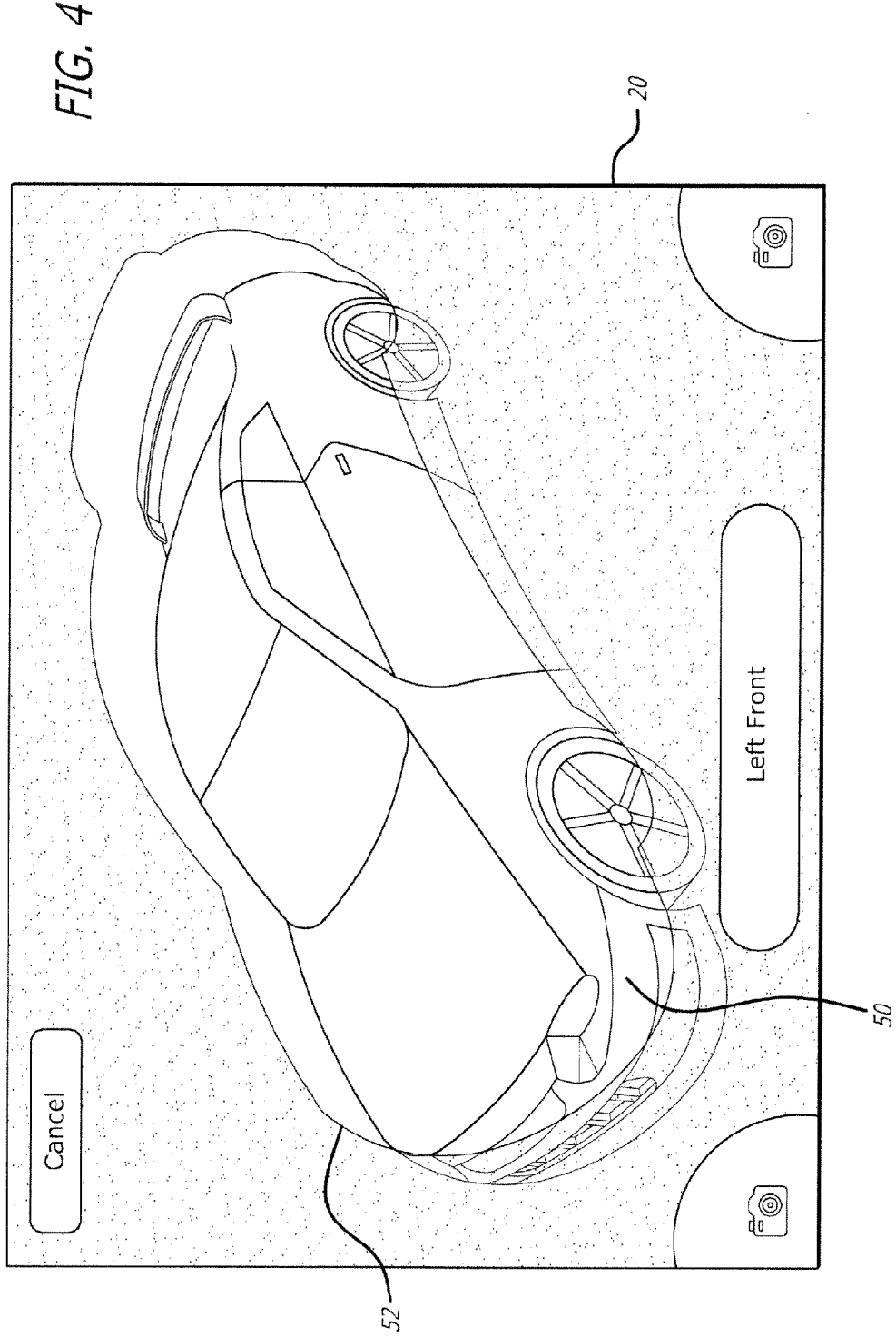
FIG. 4 is an illustration showing a vehicle image and the graphic overlay out of alignment.

FIGS. 3, 4 and 5 shows how a photograph of a vehicle 50 can be captured using a graphic overlay 52 The user can enter information regarding the vehicle. For example, the user can input the year, make and model of the vehicle. A graphic overlay 52 of the identified vehicle is displayed on the camera device 20 as shown in FIG. 3. As shown in FIG. 4, the user can then operate the camera device to obtain an image of the vehicle 50 that is displayed with the graphic overlay 52. The graphical overlay 52 may be transparent so that the user can see the image of the vehicle. Although a process wherein the overlay 52 is displayed before the image of the vehicle 50, it is to be understood that the process may be reversed so that the vehicle 50 can be displayed before the overlay 52.

The user can move the camera to align the vehicle image 50 with the graphical overlay 52 as shown in FIG. 5. The vehicle image 50 can be stored in memory when the image 50 is aligned with the graphical overlay 52. This can be accomplished by the user "clicking" the camera to capture the image of the vehicle 50. The graphical image 52 can be displayed in a manner so that the stored image has a predetermined horizontal angle, vertical height, size, resolution and/or quality. The stored image may be provided with an insurance estimate. Creating standardized image parameters such as horizontal angle and height promotes consistency and uniformity in the estimating process.

The graphical overlay 52 can be created by extrapolating a 2D image showing only the outline and various highlights of the vehicle from a 3D model of the vehicle. The area between the outline may be shaded but still transparent when overlayed onto the video image captured by the camera. The color of the shaded area and outlines can be varied. For example, the shaded area and outlines may be gray, but the user can change the color to yellow. This would be desirable if the vehicle is gray and would be difficult to distinguish from a gray shaded area and outline. Some vehicle components, such as the front driver side wheel may be created in the overlay 52. This would allow the user to align the wheel of the image captured by the camera with the graphical wheel provided by the overlay.

By way of example, the assignee Audatex has a database(s) that contains 3D models of various vehicles. The overlays may be created from these 3D models. For example, the 3D models can be rotated and otherwise manipulated to achieve the desired horizontal angle, vertical height and vehicle size. The outline of the 3D model is then extrapolated to create the overlay 52. Overlays for various vehicles can be created and stored in a database(s).

The photograph of the vehicle can be used in a process to create an insurance estimate. FIG. 6 shows an example of an claim page 100 used to create an insurance estimate. The claim page may include a VIN field 102 that allows a user to enter a VIN. The page 100 may include vehicle information fields, including but not limited to ORIGIN 104, MAKE 106, YEAR 108, MODEL 110, STYLE 112, ENGINE 114 and TRANSMISSION 116, exterior and interior Paint code, color, refinish type and production date fields. The page may further include vehicle package fields 118 and vehicle option fields 120 that can be selected and deselected to indicate the options of a vehicle. Entering the VIN may automatically populate certain fields of the page 100.

Figure 7:
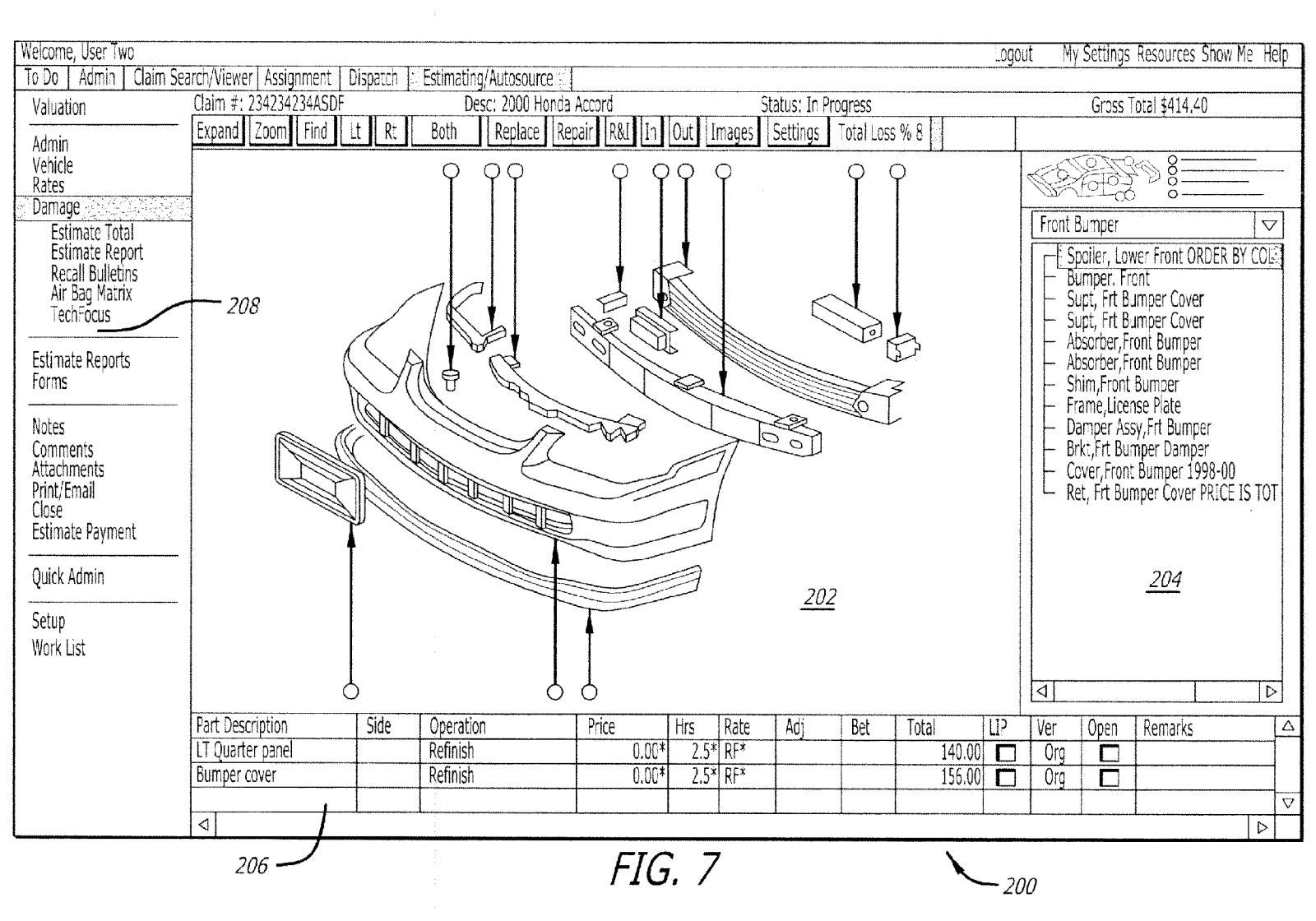
Figure 8:
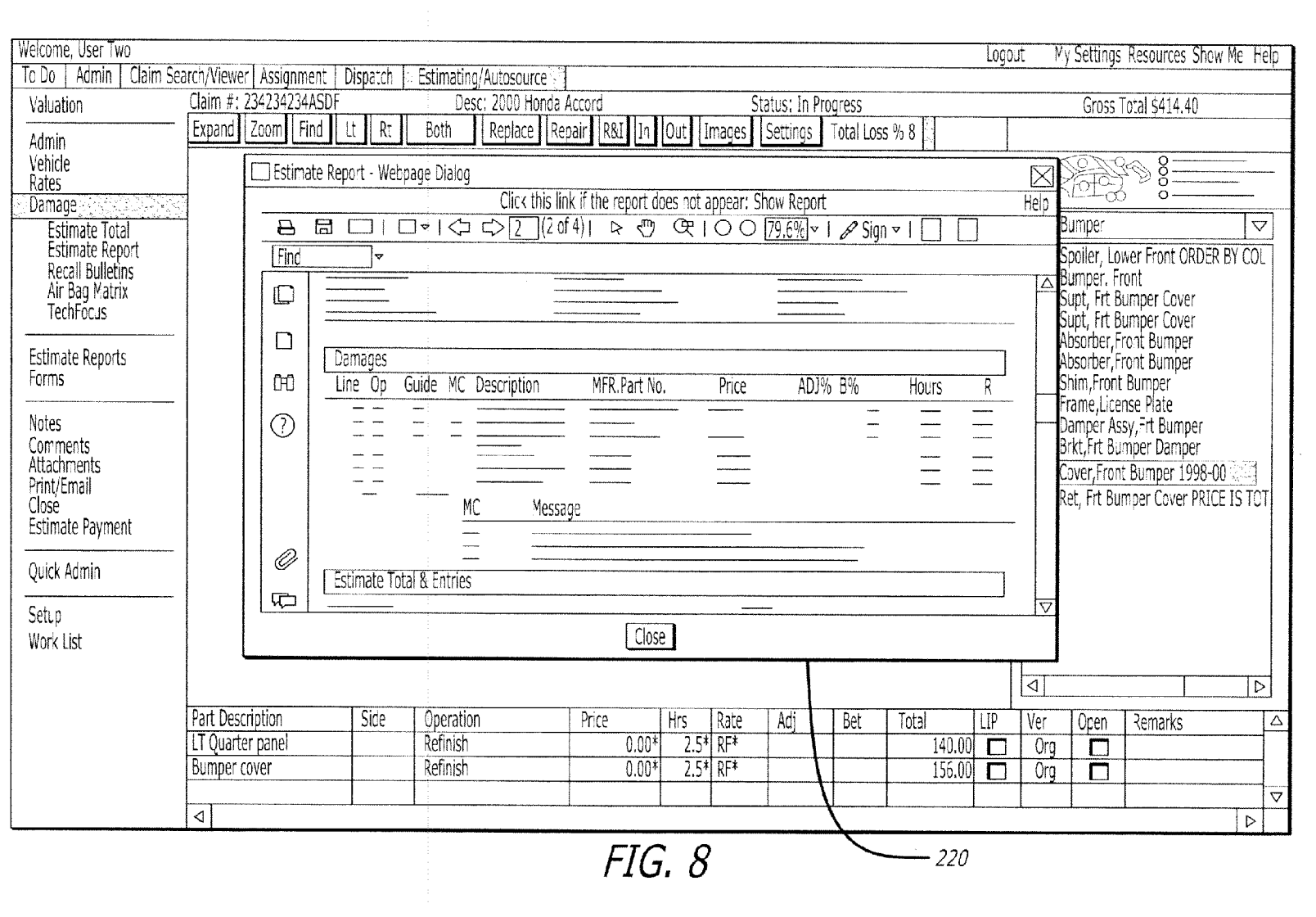

A representative may enter and/or select damaged parts for the vehicle. FIG. 7 shows an example of an estimating page 200 that allows the user to enter and/or select damaged parts of a vehicle. The page 200 may include a graphical section 202 that can be selected by the representative and a text section 204 that lists a plurality of selectable parts for the vehicle. The parts that are selected to be replaced or repaired can be listed in section 206. An estimate page can be displayed by selecting the "Estimate Total" link 208 shown in FIG. 7. FIG. 8 shows a page 220 that displays a running cost total of the estimated damage of the vehicle. The process may have a feature (not shown) that provides a warning to the representative that the cost total exceeds a "totaled" value at which point the representative may discontinue the process and request a vehicle valuation. After all of the parts to be repaired or damaged are selected the representative may obtain a final repair cost estimate and/or vehicle valuation. The photograph of the vehicle can be associated with the estimate. For example, the photograph can be attached to the estimate file.

Figure 9:
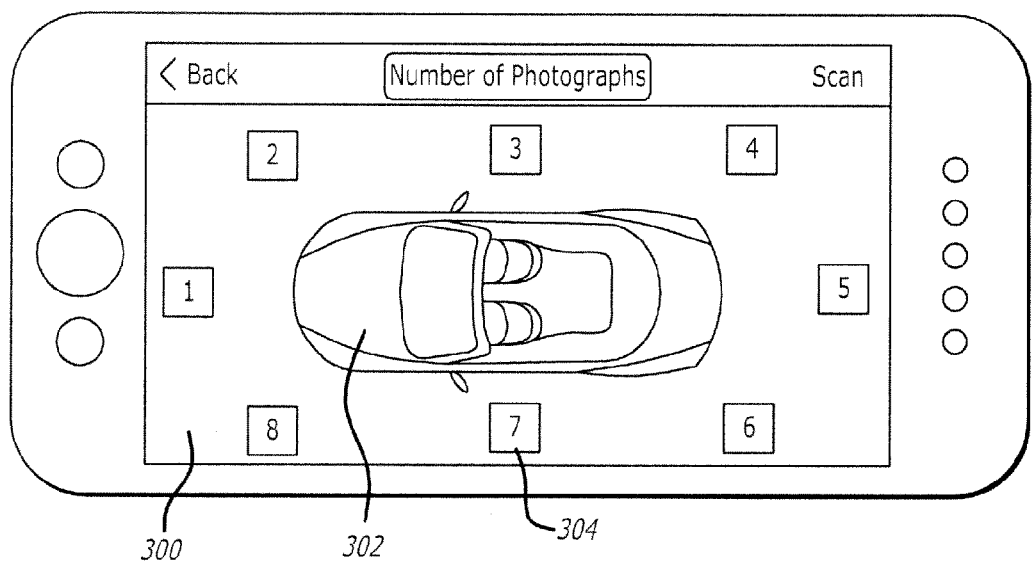
FIG. 9 is an illustration showing a graphical image of a vehicle with a plurality of graphical position indicators.
Figure 10:
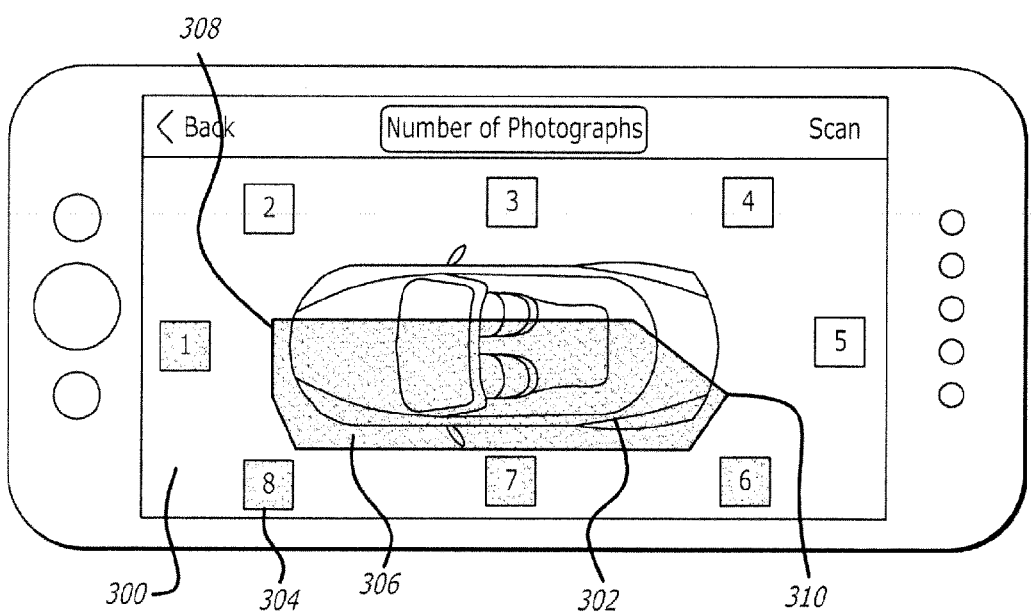
FIG. 10 is an illustration similar to FIG. 9, showing a plurality of graphical position indicators selected to define an area of a vehicle that is to be photographed.
Figure 11:
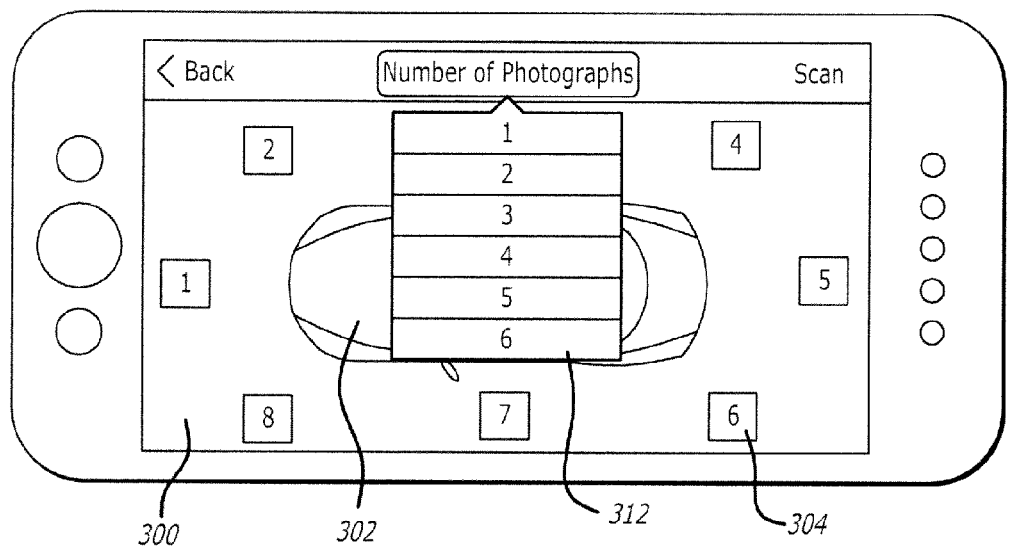
FIG. 11 is an illustration similar to FIG. 9 with a pull down screen that allows a user to select a number of photographs.

FIGS. 9-15 show a process for capturing a plurality of vehicle images that can be subsequently played back at a rate that provides a three dimensional visual representation of the vehicle. FIG. 9 shows a graphical user interface 300 that depicts a graphical vehicle 302 and a plurality of graphical position indicators 304. As shown in FIG. 10 a subset of the indicators 304 can be selected by a user. The selection of the indicators creates graphical photo capture area 306 on the vehicle. The graphical photo capture area 306 may include an initial reference point 308 and a final reference point 310. Although only two reference points are described, it is to be understood that any number of reference points can be implemented. FIG. 11 shows a pull down screen 312 that allows a user to define how many photographs are to be captured. It is to be understood that FIGS. 9-11 may not be presented to a user.

Figure 12:
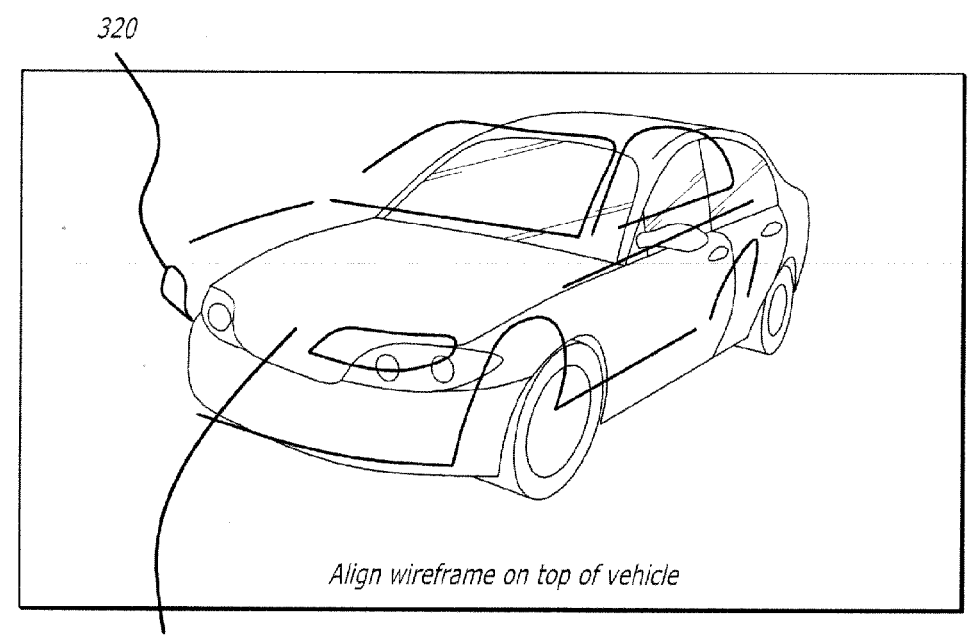
FIG. 12 is an illustration showing a graphical overlay superimposed onto an image of a vehicle.

FIG. 12 shows a screen of a camera depicting a graphical overlay 320 superimposed onto a vehicle image 322. The graphical overlay 320 corresponds to a reference model of the vehicle. The camera operates software algorithms that recognize the spatial existence of the vehicle and creates spatial vehicle data, such as reference points. By way of example, spatial vehicle data can be calculated utilizing point cloud mapping and edge detection techniques employed by a product sold by Metaio, Inc. of San Francisco, Calif. Matching algorithms are employed to match the spatial vehicle data with like data points of the vehicle model so that the system can determine the orientation at which the user is viewing the vehicle. For example, the matching technique may match the initial 308 and final 310 reference points of the graphical photo capture area 306 shown in FIG. 10 with the corresponding points on the vehicle image 322.

Figure 13:
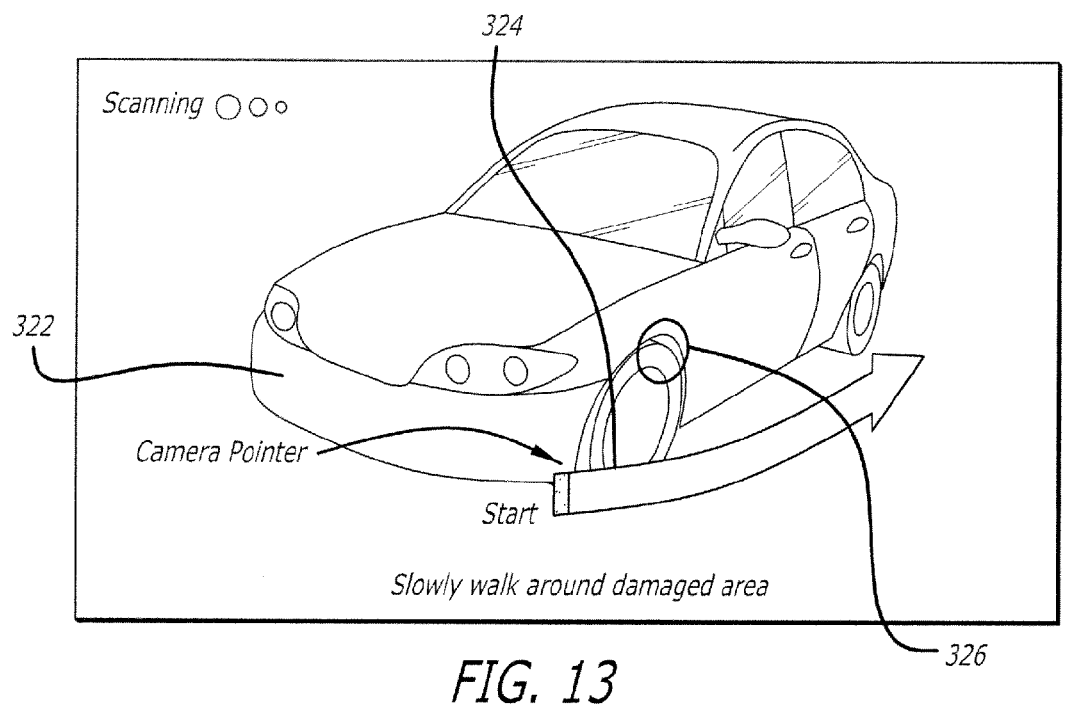
FIG. 13 is an illustration showing a graphical arrow and graphical bullseye superimposed onto the vehicle.

As shown in FIG. 13 the camera screen displays a graphical arrow 324 depicting where the user should start capturing images. A graphical bullseye 326 may also be displayed on the screen. The graphical bullseye 326 may provide a visual indicator of the focal point for the camera during the entire image capture process. Although an arrow 324 and bullseye 326 are shown, it is to be understood that other graphical indicators can be utilized.

Figure 14:
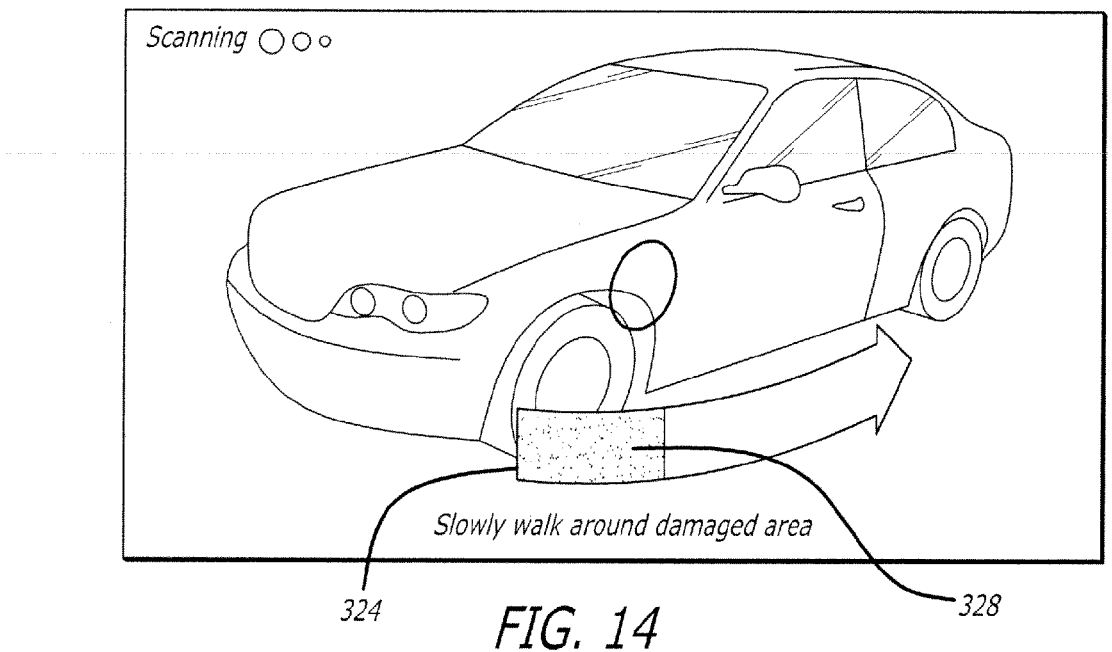
FIG. 14 is an illustration showing the graphical arrow and graphical bullseye superimposed onto the vehicle as multiple images are being captured by a camera; and, FIG. 15 is an illustration showing the graphical arrow and the graphical bullseye superimposed onto the vehicle when the process of capturing images of the vehicle has been completed.
Figure 15:
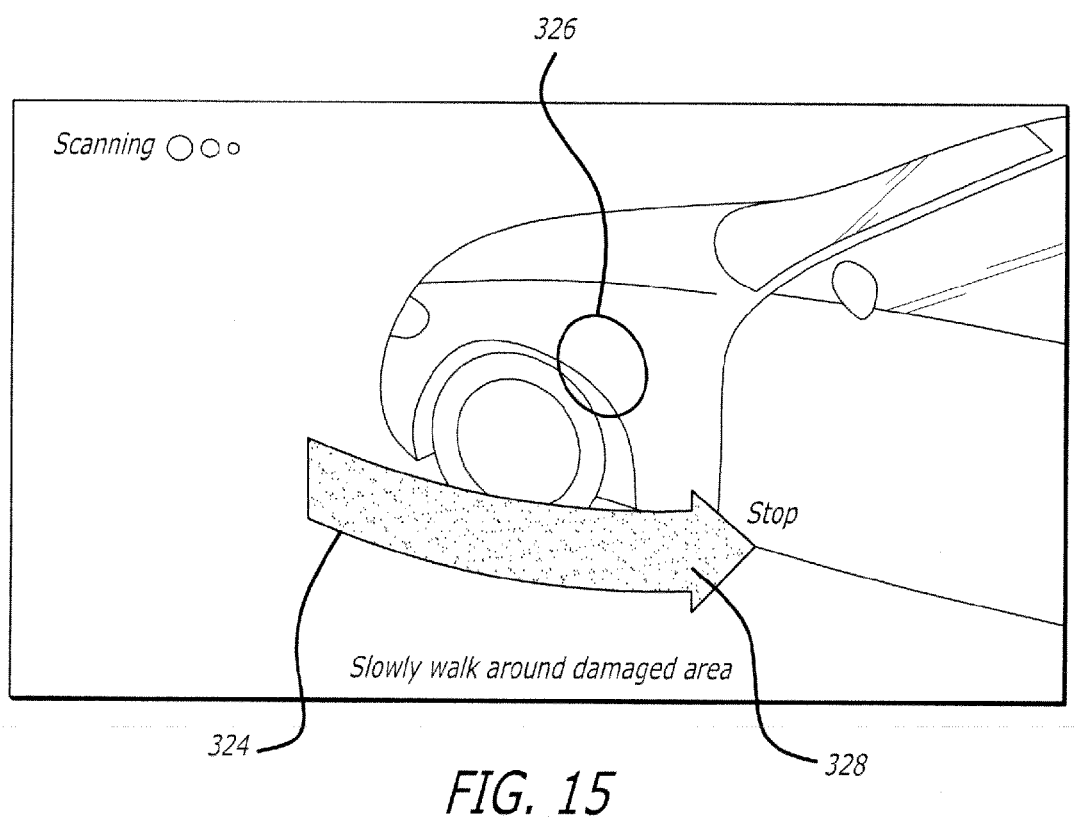

As shown in FIGS. 14 and 15 the user can move about the vehicle in the direction indicated by the graphical arrow 326. The software causes the camera to automatically capture vehicle images as the user moves about the vehicle. The graphical arrow 326 may include a shaded area 328 that fills in as the user moves about the vehicle until completed shaded, indicating the end of the process. The software may perform calculations to determine whether the user is moving at a rate above a threshold. For example, if the process is to capture 10 photos, the process can determine whether the user is moving at a rate that will not capture 10 photos at the end of the process. The shaded area 328 may change colors to indicate an excessive movement rate of the user.

The captured vehicle images are stored in the memory of the camera and sent through the network so that the images can be reviewed at an insurance estimate computer. The user can play back the captured vehicle images at a rate such that the still captured vehicle images provide a 3-D visual representation of the vehicle. The user can utilize the captured vehicle images to generate an insurance estimate.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A camera device that assists a user in photographing a vehicle for use in a vehicle insurance estimate, comprising:
   a camera that captures images of the vehicle, said camera includes a screen that displays an image of the vehicle and a graphical arrow that indicates a direction in which a plurality of vehicle images are to be captured and provides an indication of a rate that said captured vehicle images are being captured, said camera includes a memory that stores a plurality of captured vehicle images of the vehicle each captured from a different vantage point, said camera transmits said plurality of captured vehicle images that are reviewed at an insurance estimate computer.

2. The camera device of claim 1, wherein said screen displays a graphic overlay shaped like the vehicle and utilized to capture the plurality of captured vehicle images.

3. The camera device of claim 2, wherein said camera matches at least one reference point of the vehicle with at least one reference point of the graphical overlay.

4. The camera device of claim 2, wherein said captured vehicle images are reviewed at a rate that provides a 3-D visual representation of the vehicle.

5. The camera device of claim 1, wherein said screen displays a graphical bullseye that provides a focal point for said camera.

6. The camera device of claim 1, wherein said screen displays a graphical indication that allows a user to select an area of the vehicle to captured said captured vehicle images.

7. A non-transitory computer program storage medium, comprising computer-readable instructions for assisting a user in photographing a vehicle for use in a vehicle insurance estimate, execution of said computer-readable instructions by at least one processor of a camera device performs the steps:
   displaying an image of the vehicle and a graphical arrow that indicates a direction in which a plurality of vehicle images are to be captured on a screen of a camera device and provides an indication of a rate that said captured vehicle images are being captured;
   capturing a plurality of captured vehicle images at different vantage points with the camera device;
   storing in memory of the camera device the plurality of captured vehicle images;
   transmitting the plurality of captured vehicle images; and, reviewing the captured vehicle images at an insurance estimate computer.

8. The non-transitory computer program storage medium of claim 7, wherein said screen displays a graphic overlay shaped like the vehicle and utilized to capture the plurality of captured vehicle images.

9. The non-transitory computer program storage medium of claim 8, further comprising matching at least one reference point of the vehicle with at least one reference point of the graphical overlay.

10. The non-transitory computer program storage medium of claim 8, wherein said captured vehicle images are reviewed at a rate that provides a 3-D visual representation of the vehicle.

11. The non-transitory computer program storage medium of claim 7, wherein said screen displays a graphical bullseye that provides a focal point for said camera.

12. The non-transitory computer program storage medium of claim 7, wherein said screen displays a graphical indication that allows a user to select an area of the vehicle to captured said captured vehicle images.

13. A method for assisting a user in photographing a vehicle for use in a vehicle insurance estimate, comprising;
   displaying an image of the vehicle and a graphical arrow that indicates a direction in which a plurality of vehicle images are to be captured on a screen of a camera device and provides an indication of a rate that said captured vehicle images are being captured;
   capturing a plurality of captured vehicle images at different vantage points with the camera device;

storing in a memory of the camera device the plurality of captured vehicle images;
transmitting the plurality of captured vehicle images; and,
reviewing the captured vehicle images at an insurance estimate computer.

14. The method of claim 13, further comprising displaying on the screen a graphic overlay shaped like the vehicle and utilized to capture the plurality of captured vehicle images.

15. The method of claim 14, further comprising matching by the camera at least one reference point of the vehicle with at least one reference point of the graphical overlay.

16. The method of claim 14, wherein the captured vehicle images are reviewed at a rate that provides a 3-D visual representation of the vehicle.

17. The method of claim 14, wherein the screen displays a graphical bullseye that is a focal point for the camera.

* * * * *